US012692090B2

(12) United States Patent
Zhou et al.

(10) Patent No.: US 12,692,090 B2
(45) Date of Patent: Jul. 28, 2026

(54) DETECTION MECHANISM AND BATTERY PRODUCTION LINE

(71) Applicant: CONTEMPORARY AMPEREX TECHNOLOGY (HONG KONG) LIMITED, Hong Kong (CN)

(72) Inventors: Kai Zhou, Ningde (CN); Xueqing Gong, Ningde (CN); Guangwei Zhou, Ningde (CN); Jiawu Cheng, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 340 days.

(21) Appl. No.: 18/497,923

(22) Filed: Oct. 30, 2023

(65) Prior Publication Data

US 2024/0425294 A1 Dec. 26, 2024

Related U.S. Application Data

(63) Continuation of application No. PCT/CN2023/101801, filed on Jun. 21, 2023.

(51) Int. Cl.
*B65G 43/08* (2006.01)
*G01K 13/00* (2021.01)
*H01M 10/04* (2006.01)

(52) U.S. Cl.
CPC ............. *B65G 43/08* (2013.01); *G01K 13/00* (2013.01); *H01M 10/0404* (2013.01);
(Continued)

(58) Field of Classification Search
CPC ............ B65G 43/08; B65G 2203/0233; B65G 2203/045; B65G 2203/047; G01K 13/00; H01M 10/0404; Y02E 60/10
See application file for complete search history.

(56) References Cited

U.S. PATENT DOCUMENTS 7,422,365 B2 9/2008 Chamberlain et al.

FOREIGN PATENT DOCUMENTS

CN 215930844 U 3/2022
CN 115077396 A 9/2022
(Continued)

OTHER PUBLICATIONS

Computer translation of JP H11-179772 downloaded from the JPO website (Year: 2025).*
(Continued)

*Primary Examiner* — Randy W Gibson
(74) *Attorney, Agent, or Firm* — Ladas & Parry LLP

(57) ABSTRACT

The present application relates to a detection mechanism and a battery production line. The detection mechanism includes a conveying unit, configured to convey the device to be detected; a first detection unit, configured to detect the temperature of the device to be detected; and a trigger unit, configured to detect the distance between the first detection unit and the device to be detected. When the distance between the first detection unit and the device to be detected is less than a preset distance value, the trigger unit controls the conveying unit to stop conveying. The detection mechanism and the battery production line in the embodiments of the present application can ameliorate the problem of poor universality.

16 Claims, 3 Drawing Sheets

(52) U.S. Cl.
CPC ................ *B65G 2203/0233* (2013.01); *B65G 2203/045* (2013.01); *B65G 2203/047* (2013.01)

(56) References Cited

FOREIGN PATENT DOCUMENTS

| | | | |
|----|-------------|-----|---------|
| CN | 217504735 U | | 9/2022 |
| CN | 217505684 U | | 9/2022 |
| CN | 217931435 U | | 11/2022 |
| CN | 115842149 A | * | 3/2023 |
| CN | 218956652 U | | 5/2023 |
| CN | 219066893 U | | 5/2023 |
| JP | H11179774 A | | 7/1999 |
| JP | 2018087735 A | | 6/2018 |

OTHER PUBLICATIONS

Computer translation of CN 115842149 A (Year: 2025).*
Extended European search report for EP application No. 23802139.8, dated Jun. 19, 2024.
International Search Report for PCT application No. PCT/CN2023/101801, dated Nov. 24, 2023.
Written Opinion of International Searching Authority for PCT application No. PCT/CN2023/101801, dated Nov. 24, 2023.
Notification of Grant of Invention Patent, CN application No. 202380066566.1, dated Jan. 7, 2026.

* cited by examiner

DETECTION MECHANISM AND BATTERY PRODUCTION LINE

CROSS REFERENCE TO RELATED APPLICATION

This application is a continuation of International Patent Application No. PCT/CN2023/101801, filed on Jun. 21, 2023, which is incorporated by reference in its entirety.

TECHNICAL FIELD

The present application relates to the technical field of batteries, and more specifically, to a detection mechanism and a battery production line.

BACKGROUND

Before battery cells leave the battery production line, the battery cells need to undergo temperature detection to ensure the product performance. In related technologies, a temperature detection mechanism often has a single detection item for battery cells and poor universality and cannot well adapt to temperature test requirements in production.

SUMMARY

Based on this, it is necessary to provide a detection mechanism and a battery production line in view of the problem of poor detection universality of the current devices for battery cells.

A first aspect of the embodiments of the present application provides a detection mechanism configured to detect a device to be detected. The detection mechanism includes: a conveying unit, configured to convey the device to be detected; a first detection unit, configured to detect the temperature of the device to be detected; and a trigger unit, configured to detect the distance between the first detection unit and the device to be detected. When the distance between the first detection unit and the device to be detected is less than a preset distance value, the trigger unit controls the conveying unit to stop conveying.

In an embodiment, the detection mechanism includes a second detection unit; the second detection unit is configured to detect the temperature of a top surface of the device to be detected; and the first detection unit is configured to detect the temperature of a side surface of the device to be detected.

In an embodiment, the detection mechanism includes a rack; the first detection unit is movably arranged on a side of the rack; the second detection unit is movably arranged at the top of the rack; and the conveying unit passes through the rack.

In an embodiment, the first detection unit includes a first moving assembly, a second moving assembly, and a first temperature probe; the first moving assembly is movably arranged on the rack along an X-axis direction; the second moving assembly is movably arranged on the first moving assembly along a Y-axis direction; and the first temperature probe is movably arranged on the second moving assembly along a Z-axis direction.

In an embodiment, the conveying unit passes through the rack along the X-axis direction.

In an embodiment, the trigger unit is arranged on one side or two opposite sides of the first temperature probe along the X-axis direction.

In an embodiment, the first moving assembly includes a first driver, a sliding rail, and a sliding block; the sliding rail extends along the X-axis direction and is fixed to the rack; and the first driver is capable of driving the sliding block to reciprocate relative to the sliding rail.

In an embodiment, the first moving assembly includes a drag chain, and the first driver is electrically connected to the outside through the drag chain.

In an embodiment, the second moving assembly includes a second driver and a movable member; the second driver is fixedly arranged on the sliding block; and the second driver is capable of driving the movable member to reciprocate along the Y-axis direction.

In an embodiment, the second moving assembly includes a sensor, and the sensor is configured to sense the position of the movable member along the Y-axis direction.

In an embodiment, the second moving assembly includes a guide rod extending along the Z-axis direction and a fixing bracket; the guide rod is arranged on the movable member; the fixing bracket is movably arranged on the guide rod; and the first temperature probe is fixedly arranged on the fixing bracket.

In an embodiment, the trigger unit includes a micro switch and a controller; the micro switch is configured to detect the distance between the first detection unit and the device to be detected; the micro switch is in signal connection with the controller; and when the distance between the first detection unit and the device to be detected is less than the preset distance value, the controller controls the conveying unit to stop conveying.

In an embodiment, the detection mechanism further includes a third detection unit; and the third detection unit is arranged at the top of the rack and configured to perform dielectric voltage withstand test on an electrode terminal on the top surface of the device to be detected.

In an embodiment, the detection mechanism further includes a third detection unit; the third detection unit includes a probe plate, a fixed plate, and a third driver; the fixed plate is erected at the top of the rack; the probe plate is movably arranged relative to the fixed plate; the third driver is configured to drive the probe plate to be close to or away from the electrode terminal on the top surface of the device to be detected along the Z-axis direction; and the probe plate is configured to perform dielectric voltage withstand test on the electrode terminal on the top surface of the device to be detected.

In an embodiment, the detection mechanism includes a second detection unit; the second detection unit is configured to detect the temperature of a top surface of the device to be detected; the second detection unit is arranged on the probe plate; and when the probe plate is close to the electrode terminal on the top surface of the device to be detected, the second detection unit detects the temperature of the electrode terminal on the top surface of the device to be detected.

In an embodiment, the second detection unit includes at least one second temperature probe, and the second temperature probe is a contact type temperature probe.

A second aspect of the embodiments of the present application provides a battery production line including the above detection mechanism.

Beneficial effects: According to the detection mechanism and the battery production line in the embodiments of the present application, the conveying unit is arranged to convey the device to be detected, the first detection unit is arranged to detect the temperature of the device to be detected instead of a manual operation, and the trigger unit is arranged to detect the distance between the first detection unit and the device to be detected. In this way, it can be ensured that a suitable detection distance is always maintained between the device to be detected and the first detection unit, so the measured data is more accurate. Moreover, when the device to be detected is too close to the first detection unit, the trigger unit can control the conveying unit to stop conveying so as to avoid larger temperature data errors, and also avoid the interference between the device to be detected and the first detection unit in time, so the universality of the detection mechanism is better.

The above description is only a summary of the technical solutions of the present application. In order to be able to understand the technical means of the present application more clearly, the technical means can be implemented according to the content of the specification. Furthermore, to make the above and other objectives, features and advantages of the present application more comprehensible, specific implementations of the present application are exemplified below.

BRIEF DESCRIPTION OF DRAWINGS

In order to illustrate the technical solutions of the examples of the present application more clearly, the following briefly introduces the drawings required in the examples of the present application. Obviously, the drawings described below are only some examples of the present application. For those of ordinary skill in the art, other drawings can also be obtained according to the drawings without any creative effort. In the drawings.

DESCRIPTION OF REFERENCE NUMERALS

Figure 1:
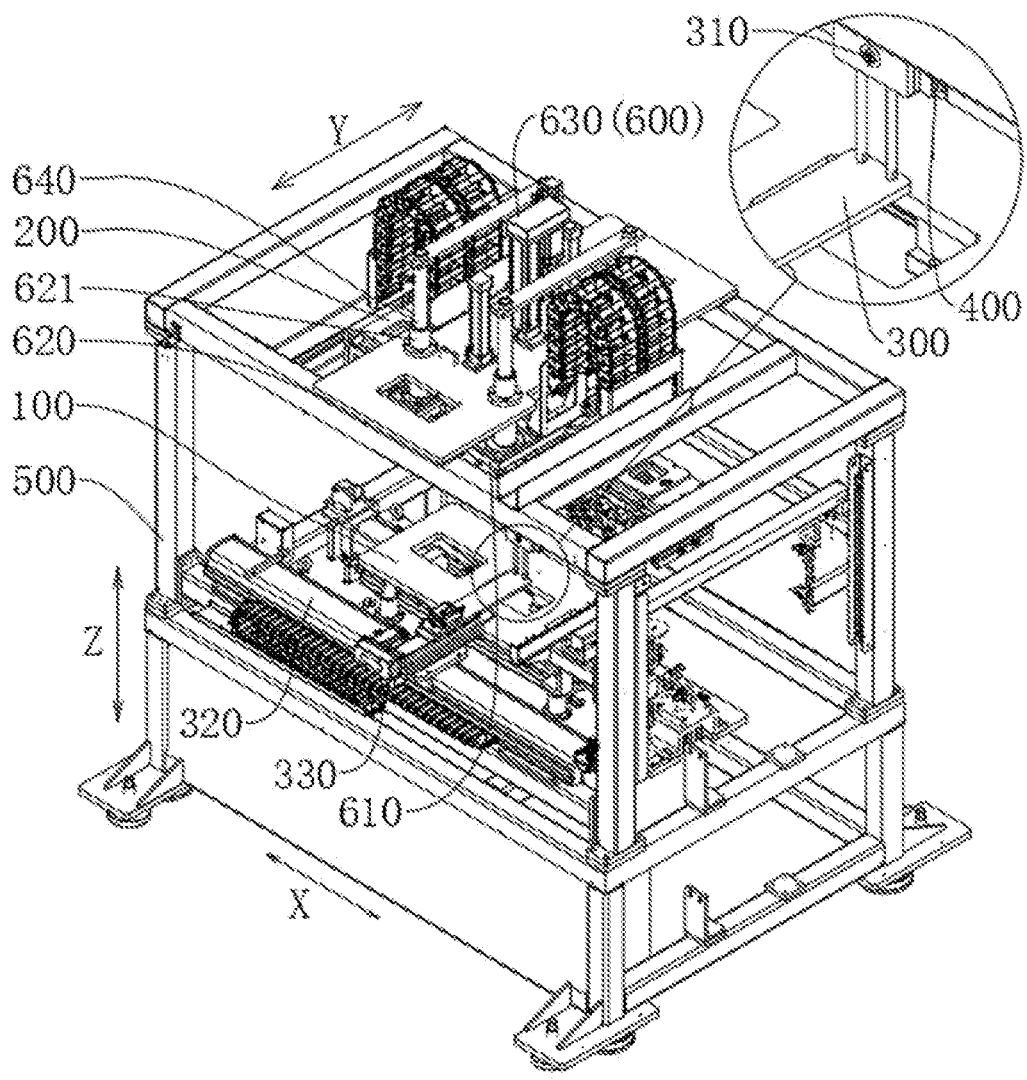
FIG. 1 is a schematic structural view of a detection mechanism according to an embodiment of the present application.

100—conveying unit,
200—second detection unit,
210—second temperature probe,
300—first detection unit,
310—first temperature probe,
320—first moving assembly,
321—first driver,
322—sliding rail,
323—sliding block,
324—drag chain,
330—second moving assembly,
331—second driver,
332—movable member,
333—sensor,
334—guide rod,
335—fixing bracket,
400—trigger unit,
410—micro switch,
500—rack, 600—third detection unit,
610—probe plate,
620—fixed plate,
630—third driver,
900—device to be detected,
910—electrode terminal.

DETAILED DESCRIPTION

Embodiments of the technical solutions of the present application will be described in detail below in conjunction with the drawings. The following embodiments are only used to more clearly illustrate the technical solutions of the present application, and therefore are only used as examples and cannot be used to limit the scope of protection of the present application.

Unless otherwise defined, all technical and scientific terms used herein have the same meaning as commonly understood by those skilled in the art belonging to the technical field of the present application. The terms used herein are intended only for the purpose of describing specific embodiments and are not intended to limit the present application. The terms "including" and "having" and any variations thereof in the specification and claims of the present application and in the descriptions of the drawings above are intended to cover non-exclusive inclusion.

In the descriptions of the embodiments of the present application, if technical terms "first", "second", and the like appear, the terms are used only for descriptive purposes to distinguish different objects, and are not to be understood as indicating or implying a relative importance or implicitly specifying the number, particular order, or primary and secondary relationship of the technical features indicated.

The reference to "embodiments" herein means that particular features, structures or characteristics described in combination with the embodiments may be included in at least one embodiment of the present application. The appearance of this phrase in various places in the specification does not necessarily refer to the same embodiment, or an independent or alternative embodiment that is mutually exclusive with other embodiments. It is explicitly and implicitly understood by those skilled in the art that the embodiments described herein may be combined with other embodiments.

In the descriptions of the embodiments of the present application, the term "and/or" is simply a description of an association relationship between associated objects, which indicates that there may be three relationships, for example, A and/or B may mean: the presence of A, the presence of both A and B, and the presence of B. In addition, the character "/" herein generally means that the associated objects before and after it are in an "or" relationship.

In the descriptions of the embodiments of the present application, if the term "multiple" appears, the meaning of "multiple" refers to at least two (including two), such as two and three, unless otherwise explicitly and specifically defined. Similarly, if the term "multiple groups" appears, the meaning of "multiple groups" refers to more than two groups (including two groups); and if the term "multiple pieces" appears, the meaning of "multiple pieces" refers to more than two pieces (including two pieces).

In the descriptions of the embodiments of the present application, if terms "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", and the like appear, the orientation or position relationships indicated by the terms are orientation or position relationships based on the drawings. The terms are only for the convenience of describing the embodiments of the present application and simplifying the descriptions, but do not indicate or imply that the specified apparatus or component needs to have a particular orientation and needs to be constructed and operated in the particular orientation, so that the terms cannot be understood as a limitation to the embodiments of the present application.

In the descriptions of the embodiments of the present application, unless otherwise explicitly specified and defined, if technical terms "mounting", "connected", "connection", "fixation", and the like appear, the terms should be understood in a broad sense. For example, the connection may be fixed connection, detachable connection, or integrated connection, or may be mechanical connection or electrical connection, or may be direct connection, indirect connection through an intermediate medium, internal communication between two elements, or interaction relationship between two elements. For those of ordinary skill in the art, the specific meanings of the above terms in the embodiments of the present application can be understood according to specific situations.

In the present application, unless otherwise explicitly specified and defined, if there are similar descriptions of a first feature being "on" or "under" a second feature, the expression may be the case that the first feature is in direct contact with the second feature, or the first feature is in indirect contact with the second feature through an intermediate medium. Furthermore, the first feature being "over," "above" and "on" the second feature may mean that the first feature is directly above or obliquely above the second feature, or only means that the level of the first feature is higher than that of the second feature. The first feature being "below", "underneath" or "under" the second feature may mean that the first feature is directly underneath or obliquely underneath the second feature, or only means that the level of the first feature is lower than that of the second feature.

It should be noted that if an element is considered to be "fixed" or "arranged" on another element, the element may be directly located on another element, or there may also be an intermediate element. If an element is considered to be "connected" to another element, the element may be directly connected to the another element, or there may be an intermediate element. If present, terms "vertical", "horizontal", "up", "down", "left" and "right" and similar expressions used in the present application are for illustrative purposes only, and do not represent the only implementation.

At present, from the perspective of the development of the market situation, power batteries are more and more widely used. Power batteries are used in energy storage power systems such as hydraulic, thermal, wind and solar power stations, and are widely used in electric vehicles such as electric bicycles, electric motorcycles and electric cars, as well as in multiple fields such as aerospace. With the continuous expansion of the application field of power batteries, the market demand is also constantly expanding.

During assembly line production of battery cells, a series of detection is required, including but not limited to, detection of temperatures of terminals on top surfaces of battery cells, voltages of battery cells, and dielectric voltage withstand performance between battery cells. Detection items are a checkpoint for the safety inspection of battery cells, and are crucial to control the safety of products. The inventors noticed that due to the size differences of different types of battery cells, a conveying unit conveys the battery cells to detection stations of the corresponding positions during the conveying process. Regions to be detected of the battery cells have distance and position differences according to different thicknesses, heights or placement angles of the battery cells at the detection stations. If a temperature detection unit for battery cells in a detection mechanism targets multiple types of battery cells simultaneously, a too far or too close distance between a precise temperature probe and a region to be detected may affect the detection accuracy. Moreover, it is necessary to consider that the interference between the precise temperature probe and the battery cell may cause damage, resulting in poor universality.

In order to alleviate the problem of poor universality, through the research, the applicants found that a trigger unit may be arranged to detect battery cells conveyed by the conveying unit at detection stations, thereby increasing the universality. In addition, the temperature of a large surface on a side of a battery cell and the temperature of a terminal on a top surface of the battery cell are detected simultaneously at the same station, thereby increasing the detection efficiency.

Based on the above consideration, through the in-depth research, the inventors have designed a detection mechanism which can be configured to detect battery cells to be detected. The temperature detection of the battery cells can be implemented by conveying the battery cells to the corresponding detection stations. Considering the position difference between the battery cells during the conveying process, collision or position deviation can be prevented by controlling the distance between the battery cells and the detection mechanism.

The battery disclosed in the embodiments of the present application refers to a single physical module including one or a plurality of battery cells to provide a higher voltage and capacity. For example, the battery mentioned in the present application may include a battery pack and the like. Some batteries may include separate box for encapsulating one or more battery cells or a plurality of battery modules. The box can prevent liquids or other foreign matters from affecting the charging or discharging of the battery cell. Of course, some batteries may not include the above separate box, and a battery cell or battery module is directly arranged in a battery mounting compartment of an electrical apparatus, that is, the battery mounting compartment serves as a box.

The battery disclosed in the embodiments of the present application can be used in, but not limited to, an electrical apparatus such as a vehicle, a ship or an aircraft. A power system of the electrical apparatus may be composed of the battery cell, the battery, and the like disclosed in the present application.

In the embodiments of the present application, the battery cell may include a lithium-ion secondary battery, a lithium-ion primary battery, a lithium-sulfur battery, a sodium/lithium-ion battery, a sodium-ion battery, a magnesium-ion battery, or the like, which is not limited in the embodiments of the present application. The battery cell may be cylindrical, flat, rectangular, or in other shapes, which is not limited in the embodiments of the present application. Battery cells are generally divided into three types according to encapsulating manners: cylindrical battery cells, square battery cells, and pouch cells, which are not limited in the embodiments of the present application.

In the embodiments of the present application, the battery cell may include a shell, an electrode assembly, and an electrolyte.

The shell may be provided with functional components such as an electrode terminal. The electrode terminal may be electrically connected to the electrode assembly to output or input the electric energy of the battery cell. An internal environment formed in the shell may be used for accommodating the electrode assembly, the electrolyte, and other components.

The electrode assembly is a component in which an electrochemical reaction occurs in the battery cell. The shell may include one or more electrode assemblies inside. The electrode assembly is mainly formed by winding or stacking a positive electrode plate and a negative electrode plate, and a separator is usually arranged between the positive electrode plate and the negative electrode plate.

The positive electrode plate includes a positive electrode current collector and a positive electrode active material layer, the positive electrode active material layer is coated on a surface of the positive electrode current collector, the positive electrode current collector which is not coated with the positive electrode active material layer protrudes from the positive electrode current collector coated with the positive electrode active material layer, and the positive electrode current collector which is not coated with the positive electrode active material layer is used as a positive tab. Taking a lithium-ion battery as an example, the material of the positive electrode current collector may be aluminum, and the positive electrode active material may be lithium cobalt oxide, lithium iron phosphate, ternary lithium, lithium manganate, or the like.

The negative electrode plate includes a negative electrode current collector and a negative electrode active material layer, the negative electrode active material layer is coated on a surface of the negative electrode current collector, the negative electrode current collector which is not coated with the negative electrode active material layer protrudes from the negative electrode current collector which is coated with the negative electrode active material layer, and the negative electrode current collector which is not coated with the negative electrode active material layer is used as a negative tab. The material of the negative electrode current collector may be copper, and the negative electrode active material may be carbon, silicon, or the like.

The material of the separator may be polypropylene (PP), polyethylene (PE), or the like. In addition, the electrode assembly may be of a wound structure or a stacked structure, which is not limited in the embodiments of the present application.

In order to ensure that no fusing occurs when a heavy current passes, there are a plurality of positive tabs which are stacked together, and there are a plurality of negative tabs which are stacked together. During the charging and discharging of the battery, the positive electrode active material and the negative electrode active material react with the electrolyte, and the tab is connected to the electrode terminal to form a current loop.

The first aspect of the present application provides a detection mechanism configured to detect a device to be detected 900. Detection items may include, but are not limited to, temperature. The device to be detected 900 may be a battery cell, an electrode assembly, or a battery. For ease of understanding, in the following embodiments, the device to be detected 900, being one or more battery cells, is taken as an example for illustration.

Referring to FIG. 1 to FIG. 4, a detection mechanism includes: a conveying unit 100, a first detection unit 300, and a trigger unit 400.

The conveying unit 100 is configured to convey the device to be detected 900. Specifically, the conveying unit 100 is provided with one or more carriers, and each carrier is provided with a positioning slot 110 suitable for carrying the device to be detected 900. The conveying unit 100 moves according to a specified path, and then, the device to be detected 900, carried by the carrier, can move according to the specified path and move to a detection station in the detection mechanism, thereby ensuring that the device to be detected 900 on the detection station can be smoothly detected by the first detection unit 300, and the loading and unloading can be smoothly achieved. For example, the conveying unit 100 may be a conveying belt, a sliding rail, a magnetic suspension track, or the like.

The first detection unit 300 is configured to detect the temperature of the device to be detected 900.

Figure 4:
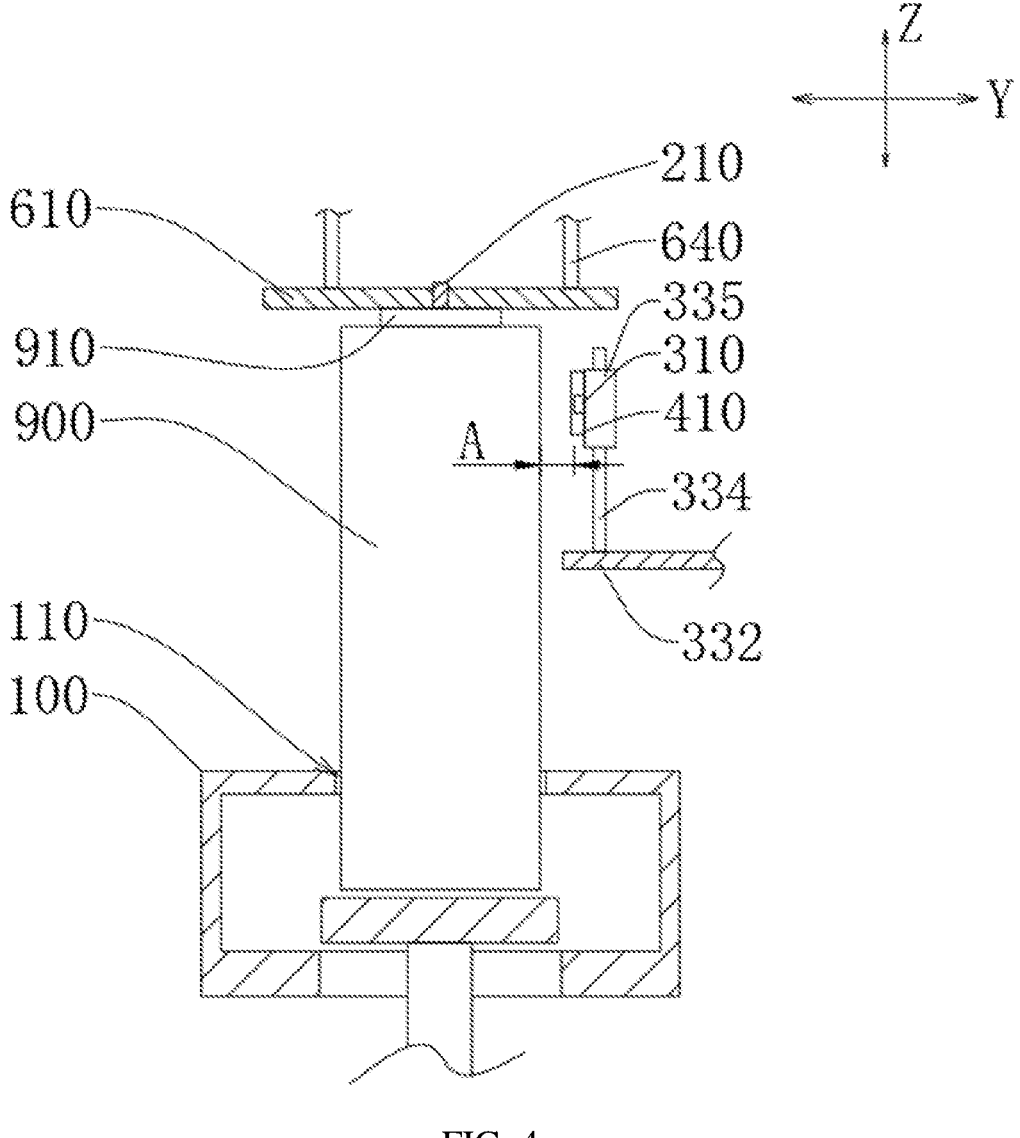
FIG. 4 is a schematic detection view of a detection mechanism and a device to be detected according to an embodiment of the present application, where a rack is omitted.

With reference to FIG. 4, the trigger unit 400 is configured to detect the distance A between the first detection unit 300 and the device to be detected 900. When the distance A between the first detection unit 300 and the device to be detected 900 is less than a preset distance value, the trigger unit 400 controls the conveying unit 100 to stop conveying. The preset distance value can be set respectively according to different models and types of the device to be detected 900, and the value can be obtained in advance through limited data accumulations, calculated theoretically, or given by designers.

Therefore, the conveying unit 100 is arranged to convey the device to be detected 900, the first detection unit 300 is arranged to detect the device to be detected 900 instead of a manual operation, and the trigger unit 400 is arranged to detect the distance A between the first detection unit 300 and the device to be detected 900. In this way, it can be ensured that a suitable detection distance is always maintained between the device to be detected 900 and the first detection unit 300, so the measured data is more accurate. Moreover, when the device to be detected 900 is too close to the first detection unit 300, the trigger unit 400 can control the conveying unit 100 to stop conveying so as to avoid generation of temperature data with larger errors, and also avoid the interference between the device to be detected 900 and the first detection unit 300 in time, so the universality of the detection mechanism is better.

In related technologies, the temperature detection of a large surface on a side of a battery cell and the temperature detection of a terminal on a top surface of the battery cell are divided into two stations, resulting in low space utilization rate.

In some embodiments, the detection mechanism includes a second detection unit 200; the second detection unit 200 is configured to detect the temperature of a top surface of the device to be detected 900; and the first detection unit 300 is configured to detect the temperature of a side surface of the device to be detected 900.

The second detection unit 200 can be configured to detect the temperature of a top surface of the device to be detected 900. That is, when the device to be detected 900 is conveyed from the conveying unit 100 to a detection station, the second detection unit 200 detects the temperature of the device to be detected 900 at the detection station. The detected part includes at least one of a top surface of the shell of the device to be detected 900 (that is, an upper end surface with an electrode terminal 910 on the shell; correspondingly, a lower end surface without a terminal on the shell can be considered as a bottom surface), and components arranged on the top surface (including, but not limited to, the electrode terminal 910, an explosion-proof pressure relief valve, and the like). The temperature detection here can be performed by a contact type temperature sensor and an infrared temperature sensor.

The first detection unit 300 is configured to detect the temperature of a side surface of the device to be detected 900. That is, when the device to be detected 900 is conveyed from the conveying unit 100 to a detection station, the first detection unit 300 detects the temperature of the device to be detected 900 at the detection station. The detected part includes at least one of a side surface of the shell of the device to be detected 900, and components arranged on the side surface. It should be noted that if the device to be detected 900 is a square battery cell, the shell of the device to be detected 900 includes a plurality of enclosed side surfaces connected between the top surface and the bottom surface of the shell of the device to be detected 900, where in the plurality of side surfaces, a side surface with a relatively large area is a large side surface, and a side surface with a relatively small area is a connecting surface. If the device to be detected 900 is a cylindrical battery cell, a peripheral surface connected between the top surface and the bottom surface of the shell of the device to be detected 900 is a side surface.

The conveying unit 100 is arranged to convey the device to be detected 900, and the second detection unit 200 at the top and the first detection unit 300 on the side are arranged to detect the temperature of the top surface and the temperature of the side surface of the device to be detected 900 instead of a manual operation. As a result, there are more comprehensive detection items, the efficiency is higher, safety accidents caused by defects of the device to be detected 900 are avoided, and the safety performance is improved.

In some embodiments, referring to FIG. 1, the detection mechanism includes a rack 500; the first detection unit 300 is movably arranged on a side of the rack 500; the second detection unit 200 is movably arranged at the top of the rack 500; and the conveying unit 100 passes through the rack 500.

The first detection unit 300 may include a first moving assembly 320, a second moving assembly 330, and a first temperature probe 310. The first moving assembly 320 is movably arranged on the rack 500 along an X-axis direction, the second moving assembly 330 is movably arranged on the first moving assembly 320 along a Y-axis direction, and the first temperature probe 310 is movably arranged on the second moving assembly 330 along a Z-axis direction.

In this way, the position of the first temperature probe 310 on the first detection unit 300 can be adjusted through the first moving assembly 320 and the second moving assembly 330, so that the distance A between the first temperature probe 310 and the device to be detected 900 is maintained in a suitable scope, and the detection accuracy of the first temperature probe 310 is ensured. When the distance A between the first temperature probe 310 and the device to be detected 900 is less than the preset distance value, the trigger unit 400 controls the conveying unit 100 to stop conveying, so as to avoid larger errors in the temperature data of the first temperature probe 310, and also avoid the interference between the device to be detected 900 and the first temperature probe 310 in time.

Optionally, the first temperature probe 310 is an infrared temperature probe. The infrared temperature probe has certain requirements for a measuring distance. When the model of the device to be detected 900 is switched or the posture of the device to be detected 900 is skewed, the infrared temperature probe is too close to the device to be detected

900, so the trigger unit 400 is arranged to control the conveying unit 100 to stop conveying in time, so as to avoid the infrared temperature probe from generating temperature data with larger errors, also avoid the collision between the device to be detected 900 and the first detection unit 300 in time, and finally avoid the damage to the detection mechanism.

It should be noted that in each embodiment of the present application, the direction of the top surface of the device to be detected 900 pointing to the bottom surface is the Z-axis direction, the X-axis direction, the Y-axis direction and Z-axis direction intersect with each other, and an intersection angle may be 90° or slightly larger or smaller. Usually, the device to be detected 900 can be arranged vertically. At this time, the Z-axis direction is the vertical direction, and the X-axis direction and the Y-axis direction may be two horizontal directions that intersect vertically in the horizontal plane.

In some embodiments, referring to FIG. 1 to FIG. 4, the trigger unit 400 includes a micro switch 410 and a controller (not shown); the micro switch 410 is configured to detect the distance A between the first detection unit 300 and the device to be detected 900; the micro switch 410 is in signal connection with the controller; and when the distance between the first detection unit 300 and the device to be detected 900 is less than the preset distance value, the controller controls the conveying unit 100 to stop conveying.

Specifically, the controller of the trigger unit 400 may be a CPU. The controller can be in signal connection with a second temperature probe 210 (mentioned below) of the second detection unit 200, a first temperature probe 310 (mentioned below) of the first detection unit 300, and the micro switch 410 to collect the corresponding data. The controller controls and is connected to the conveying unit 100, a first driver 321 (mentioned below) of the first moving assembly 320, a second driver 331 (mentioned below) of the second moving assembly 330, and a third driver 630 (mentioned below) of a third detection unit 600 (mentioned below). Therefore, the controller coordinates the actions of various moving components according to the collected corresponding data.

In some embodiments, referring to FIG. 1, the conveying unit 100 passes through the rack 500 along the X-axis direction. In this way, when the device to be detected 900 is conveyed to a corresponding detection station along the X-axis direction, the first detection unit 300 detects the temperature of the side surface of the device to be detected 900; and the second detection unit 200 detects the temperature of the top surface of the device to be detected 900 at the detection station. The manual operation can be replaced to detect the temperature of the top surface and the temperature of the side surface of the device to be detected 900, there are more comprehensive detection items, and the efficiency is higher.

Figures 2, 3:
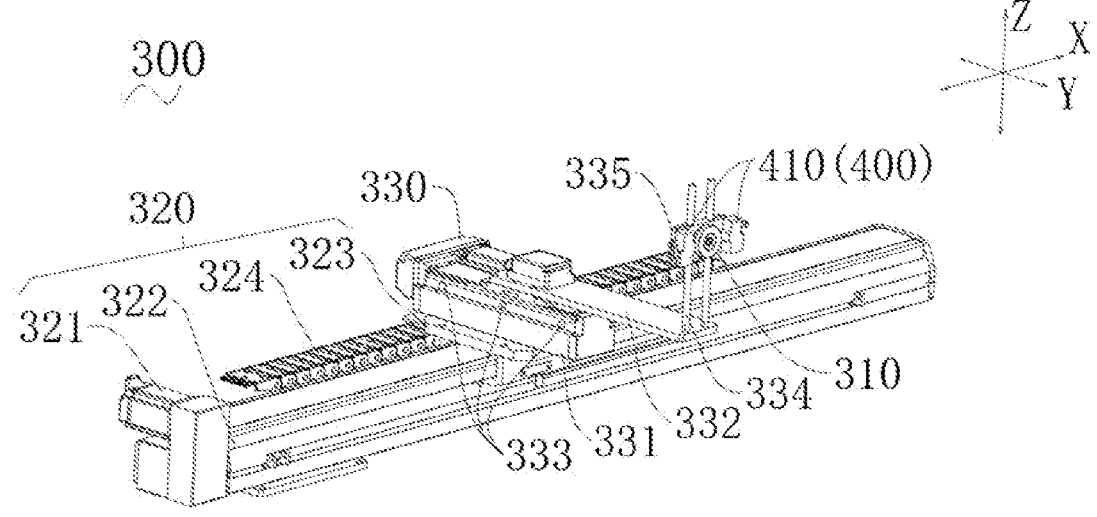
FIG. 2 is a schematic assembly view of a first detection unit and a trigger unit according to an embodiment of the present application.
FIG. 3 is a schematic assembly view of a first detection unit and a trigger unit according to an embodiment of the present application, where a first moving assembly is omitted.

In some embodiments, referring to FIG. 2, the trigger unit 400 may be arranged on one side or two opposite sides of the first temperature probe 310 along the X-axis direction.

Specifically, the micro switch 410 of the trigger unit 400 may be arranged on one side of the first temperature probe 310 along the X-axis direction. The conveying unit 100 conveys the device to be detected 900 to one side along the X-axis direction, thus the micro switch 410 can detect the device to be detected 900 on the conveying unit 100 before the first temperature probe 310 to prevent collision.

With reference to FIG. 1 to FIG. 3, the micro switch 410 of the trigger unit 400 may be arranged on two opposite sides of the first temperature probe 310 along the X-axis direction. The conveying unit 100 conveys the device to be detected 900 to any side along the X-axis direction. In this way, regardless of which side the conveying unit 100 conveys the device to be detected 900 to, the micro switch 410 can detect the device to be detected 900 on the conveying unit 100 before the first temperature probe 310 to prevent collision, thus being beneficial for the normal production of the battery production line or reversion the conveying belt in other situations.

In some embodiments, referring to FIG. 1 and FIG. 2, the first moving assembly 320 includes a first driver 321, a sliding rail 322, and a sliding block 323; the sliding rail 322 extends along the X-axis direction and is fixed to the rack 500; the sliding block 323 is slidably arranged on the sliding rail 322; and the first driver 321 can drive the sliding block 323 to reciprocate relative to the sliding rail 322.

The first driver 321 may be a servo motor or a cylinder. Taking the servo motor as an example, a programmable logic controller (PLC) (not shown) is configured to control the first driver 321, resulting in higher motion accuracy. In this way, the sliding block 323 can be accurately driven to move along the X-axis direction relative to the sliding rail 322, so that the positions of the second moving assembly 330 and the first temperature probe 310 in the X-axis direction can be adjusted.

In some embodiments, referring to FIG. 2 and FIG. 3, the second moving assembly 330 includes a second driver 331 and a movable member 332; the second driver 331 is fixedly arranged on the sliding block 323; and the second driver 331 is capable of driving the movable member 332 to reciprocate along the Y-axis direction. The first temperature probe 310 may be movably arranged at an end of the movable member 332 along the Z-axis direction.

The movable member 332 may be a rod piece or a plate body. The second driver 331 may be a cylinder or a servo motor. Taking the cylinder as an example, a telescopic rod in a cylinder body of the second driver 331 is arranged along the Y-axis direction. When air is conveyed to the second driver 331, the telescopic rod of the second driver 331 drives the movable member 332 to extend along the Y-axis direction; and with reference to the orientation shown in FIG. 4, the movable member 332 drives the first temperature probe 310 to move leftwards along the Y-axis direction, equivalent to being close to the device to be detected 900. When air is pumped to the second driver 331, the telescopic rod of the second driver 331 drives the movable member 332 to retract along the Y-axis direction; and with reference to the orientation shown in FIG. 4, the movable member 332 drives the first temperature probe 310 to move rightwards along the Y-axis direction, equivalent to being away from the device to be detected 900.

In this way, when the type or model of the device to be detected 900 on the battery production line is changed, the distance A between the first temperature probe 310 and the device to be detected 900 along the Y-axis direction can be adjusted in time by arranging the second driver 331 and the movable member 332, and then, a suitable detection distance is always maintained between the device to be detected 900 and the first detection unit 300, so that the measured data is more accurate, and unnecessary collision can also be avoided.

Optionally, referring to FIG. 1, the first moving assembly 320 includes a drag chain 324, and the first driver 321 is electrically connected to the outside through the drag chain 324. A cable or an air pipe for the first driver 321 and the second driver 331 are arranged in the drag chain 324. During the reciprocating motion of the sliding block 323 relative to the sliding rail 322, the drag chain 324 plays roles in traction and protection of the cable or the air pipe, thereby prolonging the service life of the detection mechanism.

Optionally, the second driver 331 may be a servo motor. The second moving assembly 330 includes a sensor 333, and the sensor 333 is configured to sense the position of the movable member 332 along the Y-axis direction.

The sensor 333 may be a photoelectric sensor or an electromagnetic sensor. The second moving assembly 330 may include three sensors 333, and the three sensors 333 are sequentially arranged on the body of the second driver 331 along the Y-axis direction to sense the position of the movable member 332 along the Y-axis direction. The position of the Y-axis direction corresponding to the intermediate sensor 333 may be set as an original point. The position of the Y-axis direction corresponding to the sensor 333 away from the first moving assembly 320 is the farthest point where the movable member 332 extends along the Y-axis direction, and at this time, the value of the distance A is minimum. The position of the Y-axis direction corresponding to the sensor 333 close to the first moving assembly 320 is the closest point where the movable member 332 retracts along the Y-axis direction, and at this time, the value of the distance A is maximum.

Through the three sensors 333, the PLC can be flexibly used to control the point position of the second driver 331 and accurately control the positions of both ends based on the original point.

In some embodiments, referring to FIG. 1 to FIG. 4, the second moving assembly 330 includes a guide rod 334 extending along the Z-axis direction and a fixing bracket 335, and the guide rod 334 is arranged on the movable member 332. The fixing bracket 335 is movably arranged on the guide rod 334, and the first temperature probe 310 is fixedly arranged on the fixing bracket 335.

Specifically, the guide rod 334 usually can be arranged at an end of the movable member 332 to avoid collision between the protruding movable member 332 and the device to be detected 900. The first temperature probe 310 is fixedly arranged on the fixing bracket 335. The micro switch 410 can be arranged on the fixing bracket 335 through a bolt or other structures, and located on one side or both sides of the first temperature probe 310 along the X-axis direction.

In this way, when the first moving assembly 320 and the second moving assembly 330 adjust the distances in the X-axis direction and the Y-axis direction, the fixing bracket 335 adjusts the distance relative to the guide rod 334 along the Z-axis direction, the micro switch 410 and the first temperature probe 310 can together adjust the positions in the X-axis direction, the Y-axis direction and the Z-axis direction, and the micro switch 410 and the first temperature probe 310 are relatively fixed to ensure that the micro switch 410 can detect the device to be detected 900 on the conveying unit 100 before the first temperature probe 310 to prevent collision.

In some embodiments, the trigger unit 400 further includes an alarm apparatus (not shown), and the controller controls and is connected to the alarm apparatus.

Specifically, when the distance A between the first detection unit 300 and the device to be detected 900 is less than the preset distance value, the controller controls the conveying unit 100 to stop conveying and can control the alarm apparatus to give a corresponding alarm to remind operators to eliminate faults.

In some embodiments, referring to FIG. 1 and FIG. 4, the detection mechanism further includes a third detection unit

600; and the third detection unit 600 is arranged at the top of the rack 500 and configured to perform dielectric voltage withstand test on the electrode terminal 910 on the top surface of the device to be detected 900.

During dielectric voltage withstand test, the third detection unit 600 applies a voltage to the device to be detected 900 and maintains the voltage for a certain period of time, and then detects whether the magnitude of the leakage current is maintained in the specified range to determine whether there is a short circuit between positive and negative electrodes of a battery cell. Generally, the applied voltage is 800-1500 V.

In some embodiments, referring to FIG. 1 and FIG. 4, the third detection unit 600 includes a probe plate 610, a fixed plate 620, and a third driver 630; the fixed plate 620 is erected at the top of the rack 500; the probe plate 610 is movably arranged relative to the fixed plate 620; the third driver 630 is configured to drive the probe plate 610 to be close to or away from the electrode terminal 910 on the top surface of the device to be detected 900 along the Z-axis direction; and the probe plate 610 is configured to perform dielectric voltage withstand test on the electrode terminal 910 on the top surface of the device to be detected 900.

The probe plate 610 may be a metallic conductor plate, such as a copper plate, a copper clad steel plate, or an aluminum plate.

The probe plate 610 is located below the fixed plate 620 along the Z-axis direction and is movably arranged.

The third driver 630 may be a cylinder or a motor. The fixed plate 620 may be provided with a guide cylinder 621, one end of a guide post 640 is connected to the probe plate 610, and the guide post 640 can be inserted into the guide cylinder 621. When the third driver 630 drives the probe plate 610, the guide post 640 is guided by the guide cylinder 621 to enable the probe plate 610 to be close to or away from the electrode terminal 910 on the top surface of the device to be detected 900 along the Z-axis direction.

Thus, when the probe plate 610 is in contact with the electrode terminal 910 of the device to be detected 900, a power supply assembly (not shown) in the third detection unit 600 applies a preset voltage to the probe plate 610 and maintains the preset voltage for a certain period of time, and then detects whether the magnitude of the leakage current is maintained in the specified range to determine whether there is a short circuit between positive and negative electrodes of a battery cell. In this embodiment, the preset voltage is 1000 V.

When the dielectric voltage withstand test is completed, the probe plate 610 moves upwards along the Z-axis direction and then is separated from the electrode terminal 910 of the device to be detected 900.

In some embodiments, the second detection unit 200 is arranged on the probe plate 610; and when the probe plate 610 is close to the electrode terminal 910 on the top surface of the device to be detected 900, the second detection unit 200 detects the temperature of the electrode terminal 910 on the top surface of the device to be detected 900.

Specifically, when the probe plate 610 is in contact with the electrode terminal 910 of the device to be detected 900, the second temperature probe 210 of the second detection unit 200 is also in contact with the electrode terminal 910. The third detection unit 600 performs dielectric voltage withstand test on the device to be detected 900, and the second temperature probe 210 of the second detection unit 200 detects the temperature of the electrode terminal 910 on the top surface of the device to be detected 900, thereby increasing the detection efficiency, and improving the production time. Furthermore, different detection mechanisms in related technologies can be combined, so that the detection mechanism of the present application can achieve three purposes.

In some embodiments, the second detection unit 200 includes at least one second temperature probe 210.

Usually, two to ten second temperature probes 210 may be distributed on the second detection unit 200, the number of the second temperature probes 210 may be different according to different numbers of electrode assemblies in a battery cell, and each second temperature probe 210 is in signal connection with the controller respectively. When the probe plate 610 is in contact with the electrode terminal 910 of the device to be detected 900, multiple second temperature probes 210 can measure the temperatures of terminals on different electrode assemblies respectively.

In each embodiment of the present application, the second temperature probe 210 may be a contact type temperature probe which has the advantages of high detection accuracy and high temperature resistance.

In some other embodiments, the second temperature probe 210 may also be an infrared temperature probe depending on the specific design.

The second aspect of the present application provides a battery production line, including the above detection mechanism.

The technical features of the above embodiments can be combined arbitrarily. In order to make the description concise, not all possible combinations of the technical features in the above embodiments are described. However, all the combinations of the technical features should be considered as falling within the scope described in this specification provided that they do not conflict with each other.

The above embodiments only describe several implementations of the present application, and the descriptions thereof are relatively specific and detailed, but cannot therefore be understood as a limitation on the patent scope of the present application. It should be noted that those of ordinary skill in the art may further make several variations and improvements without departing from the concept of the present application, and these variations and improvements all fall within the protection scope of the present application. Therefore, the patent protection scope of the present application should be subject to the appended claims.

What is claimed is:

1. A detection mechanism, configured to detect a device to be detected,
   wherein the detection mechanism comprises:
   a conveying unit, configured to convey the device to be detected;
   a first detection unit, configured to detect the temperature of the device to be detected; and
   a trigger unit, configured to detect the distance between the first detection unit and the device to be detected, wherein when the distance between the first detection unit and the device to be detected is less than a preset distance value, the trigger unit controls the conveying unit to stop conveying;
   wherein the trigger unit comprises a micro switch and a controller;
   the micro switch is configured to detect the distance between the first detection unit and the device to be detected; and
   the micro switch is in signal connection with the controller, when the distance between the first detection unit and the device to be detected is less than the preset distance value, the controller controls the conveying unit to stop conveying.

2. The detection mechanism according to claim 1, wherein the detection mechanism further comprises a second detection unit; the second detection unit is configured to detect the temperature of a top surface of the device to be detected; and the first detection unit is configured to detect the temperature of a side surface of the device to be detected.

3. The detection mechanism according to claim 2, wherein the detection mechanism further comprises a rack; wherein the first detection unit is movably arranged on a side of the rack; the second detection unit is movably arranged at the top of the rack; and the conveying unit passes through the rack.

4. The detection mechanism according to claim 3, wherein the first detection unit comprises a first moving assembly, a second moving assembly, and a first temperature probe;

the first moving assembly is movably arranged on the rack along an X-axis direction;

the second moving assembly is movably arranged on the first moving assembly along a Y-axis direction; and the first temperature probe is movably arranged on the second moving assembly along a Z-axis direction.

5. The detection mechanism according to claim 4, wherein the conveying unit passes through the rack along the X-axis direction.

6. The detection mechanism according to claim 4, wherein the trigger unit is arranged on one side or two opposite sides of the first temperature probe along the X-axis direction.

7. The detection mechanism according to claim 4, wherein the first moving assembly comprises a first driver, a sliding rail, and a sliding block;

the sliding rail extends along the X-axis direction and is fixed to the rack; and the first driver is capable of driving the sliding block to reciprocate relative to the sliding rail.

8. The detection mechanism according to claim 7, wherein the first moving assembly comprises a drag chain, and the first driver is electrically connected to the outside through the drag chain.

9. The detection mechanism according to claim 4, wherein the second moving assembly comprises a second driver and a movable member;

the second driver is fixedly arranged on the sliding block; and the second driver is capable of driving the movable member to reciprocate along the Y-axis direction.

10. The detection mechanism according to claim 9, wherein the second moving assembly comprises a sensor, and the sensor is configured to sense the position of the movable member along the Y-axis direction.

11. The detection mechanism according to claim 9, wherein the second moving assembly comprises a guide rod extending along the Z-axis direction and a fixing bracket;

the guide rod is arranged on the movable member;

the fixing bracket is movably arranged on the guide rod; and the first temperature probe is fixedly arranged on the fixing bracket.

12. The detection mechanism according to claim 1, wherein the detection mechanism further comprises a third detection unit; and the third detection unit is arranged at the top of the rack and configured to perform dielectric voltage withstand test on an electrode terminal on the top surface of the device to be detected.

13. The detection mechanism according to claim 3, wherein the detection mechanism further comprises a third detection unit; the third detection unit comprises a probe plate, a fixed plate, and a third driver;

the fixed plate is erected at the top of the rack;

the probe plate is movably arranged relative to the fixed plate;

the third driver is configured to drive the probe plate to be close to or away from an electrode terminal on the top surface of the device to be detected along a Z-axis direction; and the probe plate is configured to perform dielectric voltage withstand test on the electrode terminal on the top surface of the device to be detected.

14. The detection mechanism according to claim 13, wherein the second detection unit is arranged on the probe plate; and when the probe plate is close to the electrode terminal on the top surface of the device to be detected, the second detection unit detects the temperature of the electrode terminal on the top surface of the device to be detected.

15. The detection mechanism according to claim 2, wherein the second detection unit comprises at least one second temperature probe, and the second temperature probe is a contact type temperature probe.

16. A battery production line, comprising the detection mechanism according to claim 1.

* * * * *